United States Patent
Miyakawa et al.

(10) Patent No.: US 6,748,178 B2
(45) Date of Patent: Jun. 8, 2004

(54) OPTICAL TRANSMISSION LINE

(75) Inventors: Takayuki Miyakawa, Kamifukuoka (JP); Masatoshi Suzuki, Kamifukuoka (JP); Noboru Edagawa, Kamifukuoka (JP)

(73) Assignees: DDI Corporation, Tokyo (JP); KDD Submarine Cable Systems, Inc., Tokyo (JP)

(*) Notice: Subject to any disclaimer, the term of this patent is extended or adjusted under 35 U.S.C. 154(b) by 509 days.

(21) Appl. No.: 09/795,245

(22) Filed: Feb. 26, 2001

(65) Prior Publication Data

US 2001/0021291 A1 Sep. 13, 2001

(30) Foreign Application Priority Data

Feb. 25, 2000 (JP) ........................................ 2000-048671

(51) Int. Cl.[7] .............................................. H04B 10/18
(52) U.S. Cl. ..................... 398/148; 398/147; 398/150; 398/92; 385/123; 385/131; 385/38
(58) Field of Search .......................... 398/148, 92, 150, 398/142, 147; 385/123, 131, 38

(56) References Cited

U.S. PATENT DOCUMENTS

| | | | | |
|---|---|---|---|---|
| 5,191,631 A | * | 3/1993 | Rosenberg | 385/123 |
| 5,323,404 A | * | 6/1994 | Grubb | 372/6 |
| 5,343,322 A | * | 8/1994 | Pirio et al. | 398/148 |
| 6,157,754 A | | 12/2000 | Sasaoka et al. | 385/24 |
| 6,178,038 B1 | * | 1/2001 | Taylor et al. | 359/337.5 |
| 6,191,854 B1 | * | 2/2001 | Grasso et al. | 356/341 |

FOREIGN PATENT DOCUMENTS

| | | |
|---|---|---|
| JP | 9-130587 | 5/1997 |
| JP | 10-322283 | 12/1998 |

* cited by examiner

*Primary Examiner*—Leslie Pascal
*Assistant Examiner*—Chau M. Nguyen
(74) *Attorney, Agent, or Firm*—Christie, Parker & Hale, LLP

(57) ABSTRACT

An optical fiber (12a) with a large effective core area and a large chromatic dispersion value is disposed on an input side of signal light, and an optical fiber (12b) with a small effective core area and a small chromatic dispersion value or a chromatic dispersion value of negative polarity is disposed on an output side of the signal light. A pumping light source (14) generates pumping light of 1450 nm to cause Raman amplification of 1550 nm in the optical fiber (12b). The output light from the pumping light source (14) enters the optical fiber (12b) from the back through a WDM optical coupler (16). Provided that $y=(Pin-\alpha)/(Pp \cdot 10 \log L)$ where input power of the optical fiber (12a) (i.e. output power of an optical transmitter (10)) is Pin, a total loss of the optical fibers (12a and 12b) is $\alpha$, pumping power for Raman amplification is Pp, and a total length of the optical fibers (12a and 12b) is L, the relation between ratio x ($0 \leq x \leq 1$) of the optical fiber (12b) and y is expressed as $y=6.63 \times 10^{-2}x - 0.077$. Here, the satisfactory x value is in a range from +0.2 to −0.2 of the y value.

3 Claims, 9 Drawing Sheets

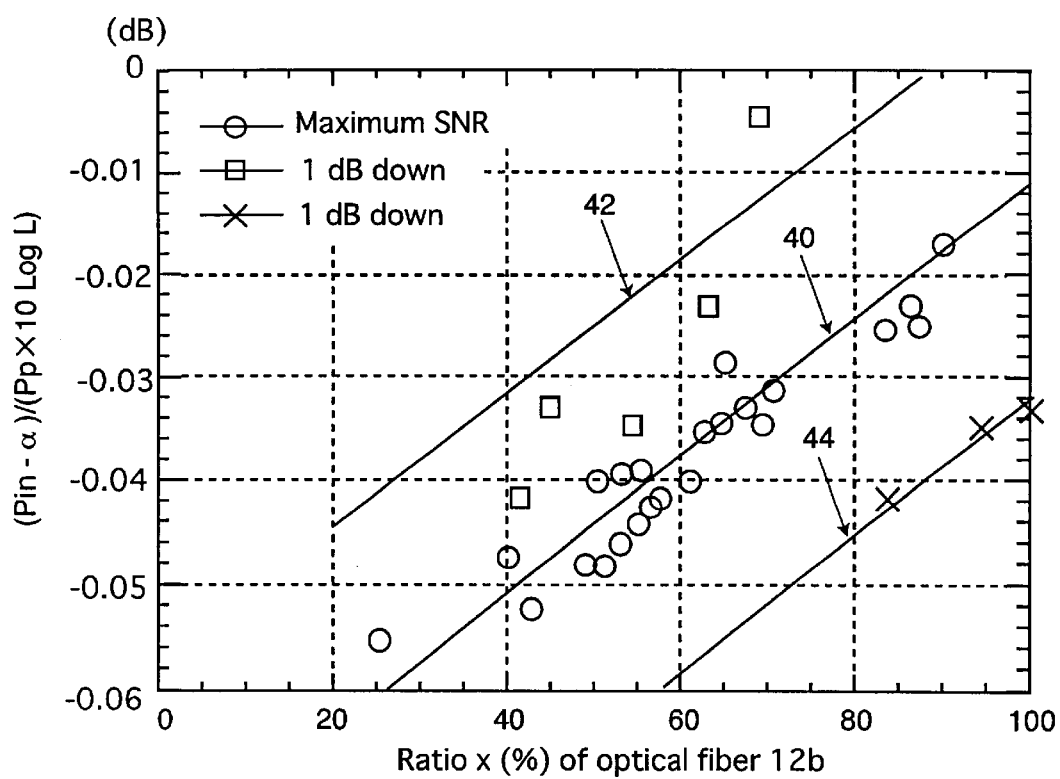

OPTICAL TRANSMISSION LINE

CROSS-REFERENCE TO RELATED APPLICATION

This application claims priority of Japanese patent application number 2000-048671, filed Feb. 25, 2000.

FIELD OF THE INVENTION

This invention relates to an optical transmission line, and more particularly relates to an optical transmission line for realizing ultra long haul repeaterless transmission or an ultra long haul repeater span.

BACKGROUND OF THE INVENTION

In ultra long haul repeater span transmission, signal-to-noise ratio (SNR) can be maintained higher as input power for each fiber span increases. However, when the optical input power increases, transmission characteristics deteriorate because the input power is limited by stimulated Brillouin scattering (SBS) and a nonlinear optical effect increases.

In the meanwhile, the following two configurations have been proposed, one is to extend a spectrum through low-frequency micro-signal modulation in order to suppress the SBS and the other is to use a fiber with a mode field diameter (MFD) as large as approximately 10 $\mu$m (e.g. a single mode fiber (SMF) having a zero dispersion wavelength at a 1.3 band) in order to reduce the nonlinear optical effect even if the optical input power is high. For instance, U.S. Pat. No. 6,157,754 and Japanese Laid-Open Patent Publication No. 10(1998)-322283 (U.S. patent application Ser. No. 09/064,020) disclose a configuration in which an optical fiber with a large effective core area and a large dispersion slope is disposed on an input side of signal light, and an optical fiber with a small effective core area and a small dispersion slope is disposed on an output side of the signal light.

Also, such configuration is well known that uses Raman amplification as a method to lengthen a repeaterless optical transmission distance or a repeater span.

However, when a single mode fiber (SMF) is used at a 1.5 $\mu$m band, accumulated chromatic dispersion becomes large as its chromatic dispersion is large (approximately −18 ps/nm/km). Accordingly, the configuration requires a large number of dispersion compensating fibers (DCF). In addition, it is difficult to obtain large Raman gain since the MFD of the single mode fiber is large as approximately 10 $\mu$m.

Generally, in order to obtain large Raman gain through a fiber Raman amplifier of backward, a fiber with a small MFD should be disposed on an output side of signal light wherein the pumping light power is large. However, in a case that the MFD is too small, fiber loss at a pumping wavelength band increases, and so large Raman gain cannot be realized and transmission characteristics do not improve.

SUMMARY OF THE INVENTION

It is therefore an object of the present invention to provide an optical transmission line to realize more satisfactory transmission characteristics by using Raman amplification.

An optical transmission line according to the invention is composed of a first optical fiber to transmit signal light and have a first effective core area and a first chromatic dispersion value, a second optical fiber to transmit the signal light from the first optical fiber and have a second effective core area smaller than the first effective core area and a second chromatic dispersion value which is either smaller than or negative-polarity of the first chromatic dispersion value, a pumping light source to generate pumping light to cause Raman amplification in the second optical fiber, and an optical coupler to apply the pumping light from the pumping light source into the second optical fiber from the back.

In the above configuration, by reducing loss of the signal light through the Raman amplification, the transmission of longer distance is realized. Also, since the effective core area of the optical fiber disposed on the input side of the signal light is larger than that of the optical fiber disposed on the output side of the signal light, the nonlinear effect is reduced and thus it becomes possible to input the signal light having even greater power.

When effective Raman gain and background noise are considered, the effective core area of the second optical fiber should preferably be from 55 $\mu$m$^2$ to 70 $\mu$m$^2$.

When input power of the first optical fiber is expressed as Pin (dBm), a total loss of the first and second optical fibers is expressed as $\alpha$ (dB), Raman pumping power is expressed as Pp (dBm), and a total length of the first and second optical fibers is expressed as L (km), it is provided that y=(Pin−$\alpha$)/(Pp·10 Log L). When the ratio of the second optical fiber to L is expressed as x (0≦x≦1), y should be preferably no more than 6.63×10$^{-2}$x+0.123 and no less than 6.63×10$^{-2}$x−0.277. With this, a satisfactory S/N ratio is obtained.

When y is practically equal to 6.63×10$^{-2}$x−0.077, the maximum S/N ratio is obtained.

BRIEF DESCRIPTION OF THE DRAWING

The above and other objects, features and advantages of the present invention will be apparent from the following detailed description of the preferred embodiments of the invention in conjunction with the accompanying drawings, in which:

FIG. 10 shows measured results of a standard parameter value to give the optimum ratio x of the optical fiber 12b.

DESCRIPTION OF THE PREFERRED EMBODIMENT

Embodiments of the invention are explained below in detail with reference to the drawings.

Figure 1:
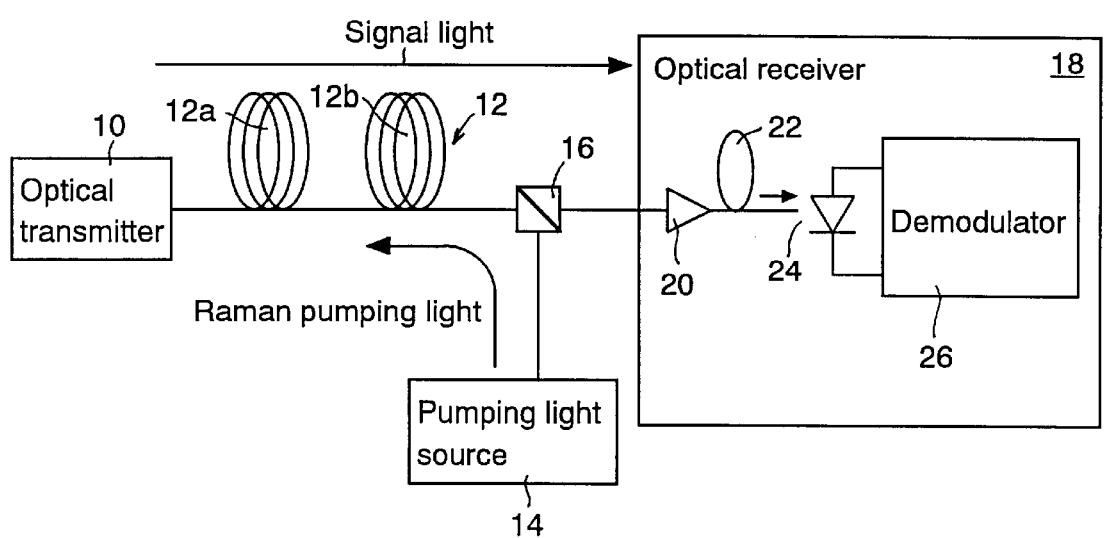
FIG. 1 is a schematic block diagram of a first embodiment according to the invention.

FIG. 1 is a schematic block diagram of a first embodiment when the present invention is applied to a repeaterless optical transmission system. An optical transmitter 10 outputs signal light having a 1.55 µm band toward an optical transmission line 12. The optical transmission line 12 is composed of an optical fiber 12a with a relatively large diameter and a large chromatic dispersion value and an optical fiber 12b with a small diameter and a chromatic dispersion value which is either smaller or to be a negative-polarity of that of the optical fiber 12a. The optical fiber 12a is disposed on an input side of the signal light and the optical fiber 12b is disposed on an output side of the signal light. The optical fiber 12a is composed of, for example, a single mode fiber having a zero dispersion wavelength at a 1.3 µm band which chromatic dispersion is 18–20 ps/nm/km and which effective core area is approximately 74 µm². The optical fiber 12b is composed of a dispersion shifted fiber shifting the zero dispersion wavelength to the 1.55 µm band which chromatic dispersion value is −2 ps/nm/km and which effective core area is approximately 49 µm².

A pumping light source 14 generates pumping light of 1450 nm for Raman amplification of 1550 nm. The output light from the pumping light source 14 enters the optical fiber 12b from the back through a WDM optical coupler 16.

The signal light from the optical transmitter 10 first enters the optical fiber 12a. Since the optical fiber 12a has a large diameter, a nonlinear effect hardly occurs even if the power of the signal light is high. After propagated on the optical fiber 12a, the signal light enters and propagates on the optical fiber 12b. The Raman pumping light from the pumping light source 14 enters the optical fiber 12b from the back through the WDM optical coupler 16. The Raman pumping light causes the Raman amplification in the optical fiber 12b, and the signal light is amplified. Because of the small diameter of the optical fiber 12b, large Raman gain can be obtained. The signal light Raman-amplified in the optical fiber 12b transmits the WDM optical coupler 16 and enters an optical receiver 18.

In the optical receiver 18, an optical amplifier 20 optically amplifies the signal light from the optical transmission line 12, and a dispersion compensating fiber 22 compensates accumulated chromatic dispersion through the optical fibers 12a and 12b. The signal light which accumulated chromatic dispersion was compensated enters a photodetector 24. The photodetector 24 converts the optical signal into an electric signal, and a demodulator 26 demodulates a data from the output of the photodetector 24.

While propagating on the optical fiber 12a, the signal light attenuates according to fiber loss of the optical fiber 12a. In the optical fiber 12b, since the Raman pumping light enters from the back, the Raman gain becomes larger as approaching to the WDM optical coupler 16 in the optical fiber 12b. So, in the optical fiber 12b, although the signal light attenuates at a part (a part close to the optical fiber 12a) where the Raman gain is smaller than the fiber loss of the optical fiber 12b, the signal light is amplified according to the difference between the Raman gain and the loss of fiber 12b at a part (a part close to the WDM optical coupler 16) where the Raman gain is larger than the fiber loss of the optical fiber 12b. Owing to this Raman amplification, in the whole optical fibers 12a and 12b, the attenuation of the signal light is reduced and accordingly the S/N ratio is improved.

Figure 2:
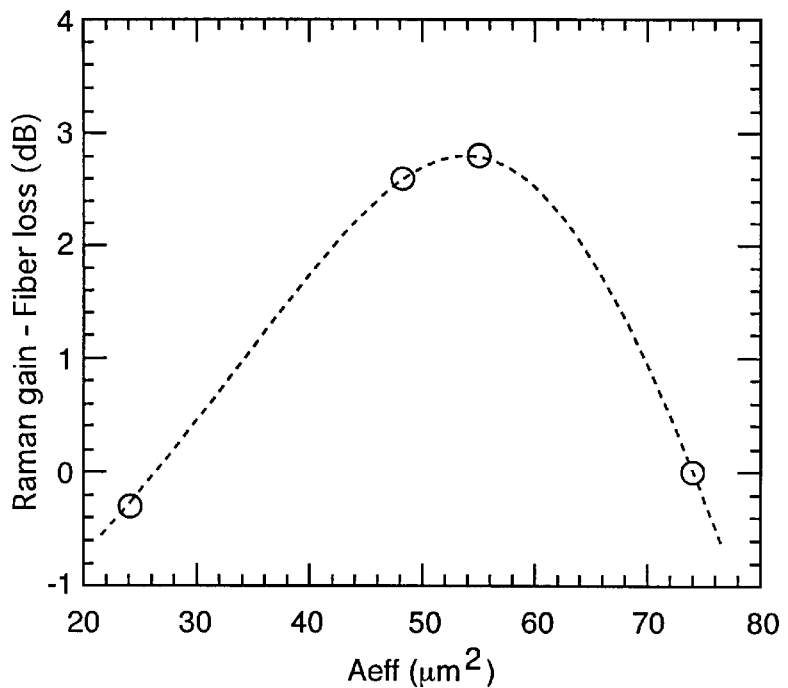
FIG. 2 is a diagram showing measured effective gain of a Raman amplifier.

Although the Raman gain increases, as the diameter of the optical fiber 12b becomes smaller, the fiber loss in a Raman pumping light band also increases. The attenuation of the Raman pumping light reduces the Raman gain. FIG. 2 shows an experimental result of an effective gain (the difference between the Raman gain and the fiber loss) relative to a fiber diameter. The horizontal axis expresses an effective core area Aeff and the vertical axis expresses a difference obtained by subtracting the fiber loss from the Raman gain. Used in the experiment were a single mode fiber (SMF) with an effective core area of 74 µm², dispersion shifted fibers (DSF) with effective core areas of 55 µm² and 49 µm², and a reverse dispersion fiber (RDF) with an effective core area of 24 µm². The length of each fiber is unified to 100 km. In FIG. 2, relative values of a measured result of the SMF are shown. FIG. 2 shows that the signal level becomes the maximum, namely the effective Raman gain becomes the maximum, when the effective core area is in a range from 55 µm² to 60 µm².

Figure 3:
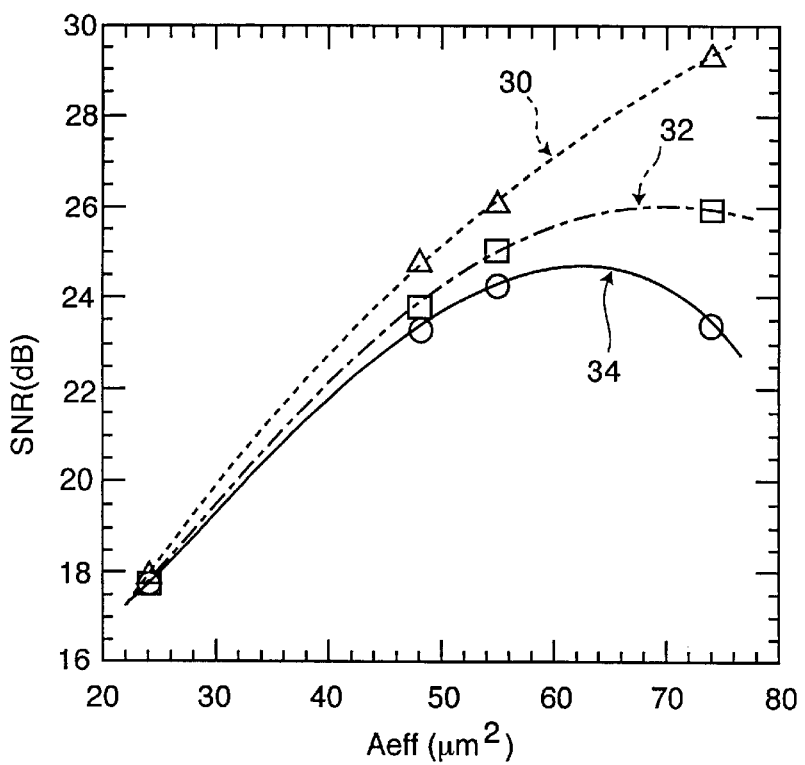
FIG. 3 shows measured results of S/N ratio relative to an effective core area of an optical fiber 12b.

Also, S/N ratio corresponding by one to one to transmission characteristics is studied in such condition that an SMF is used as the optical fiber 12a and various optical fibers are used as the optical fiber 12b. As mentioned above, a fiber with a small diameter has a large background noise level. FIG. 3 shows a measured result of S/N ratio relative to an effective core area Aeff of the optical fiber 12b. The horizontal axis expresses the effective core area Aeff of the optical fiber 12b, and the vertical axis expresses the S/N ratio. A measured value Δ on a characteristic curve 32 shows S/N ratio at the output stage of the optical fiber 12b, a measured value □ on a characteristic curve 32 shows S/N ratio at the output stage of an optical amplifier 20 (output: +5 dBm), and a measured value ○ on a characteristic curve 34 shows S/N ratio after the accumulated chromatic dispersion is compensated by the dispersion compensating fiber 22.

When an optical fiber with an effective core area from 49 µm² to 55 µm² is used as the optical fiber 12b, the accumulated chromatic dispersion of the optical fibers 12a and 12b becomes approximately 1800 ps/nm. On the other hand, when an SMF with a large diameter (an effective core area 74 µm²) is used as the optical fiber 12b, the accumulated chromatic dispersion becomes approximately 4000 ps/nm.

As obvious from the characteristic curve 34, in consideration of the dispersion compensation, the transmission characteristics become satisfactory when the effective core area is approximately 60 µm², or in a range from 55 µm² to 70 µm².

In addition, ratio of the optical fiber 12a to the optical fiber 12b is examined to optimize the S/N ratio relative to the transmission distance and the pumping power of the Raman amplification. Adapted parameters are as follows. Eight wavelengths are wavelength-division-multiplexed. The optical fiber 12a is composed of a single mode optical fiber with loss of 0.19 dB/km, chromatic dispersion of 19 ps/nm/km, and a mode field diameter (MFD) of 10 µm. The optical fiber 12b is composed of a dispersion shifted optical fiber with loss of 0.21 dB/km, chromatic dispersion of −2 ps/nm/km, and a mode field diameter (MFD) of 8.6 µm. A dispersion compensating fiber 22 for dispersion compensation is with loss of 0.6 dB/km and chromatic dispersion of −85 ps/nm/km. The Raman gain in the optical fiber 12b is calculated on the basis of the experimental values, on the condition that the Raman amplification is used when the optical fiber 12b is 50 km long or more and the Raman gain is fixed regardless of the ratio of the optical fibers 12a and 12b. The noise to be generated because of the Raman amplification is calculated based on the experimental values. The optical amplifier 20 has the noise figure (NF) of 6 dB and the output of +5 dBm. The dispersion compensating fiber 22 is provided to compensate the accumulated chromatic dispersion of the transmission line.

On the above-mentioned condition, input power Pin of the optical fiber 12a (namely, output power of the optical transmitter 10), pumping power Pp from the pumping light source 14, and a total length of the optical fibers 12a and 12b, namely a transmission line length L are varied to measure how S/N ratio changes according to length ratio x of the optical fiber 12b to L.

Figure 4:
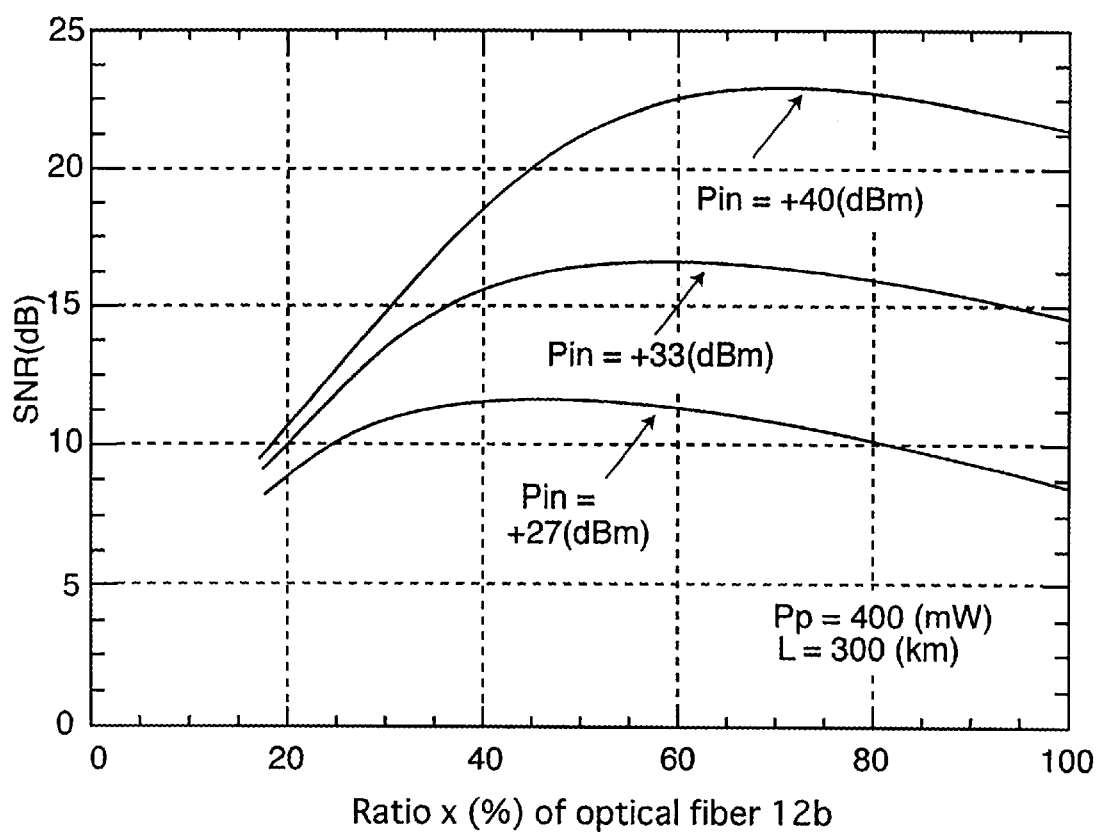
FIG. 4 is a diagram showing variations of S/N ratio relative to ratio x of the optical fiber 12b when fiber input power Pin is varied.
Figure 5:
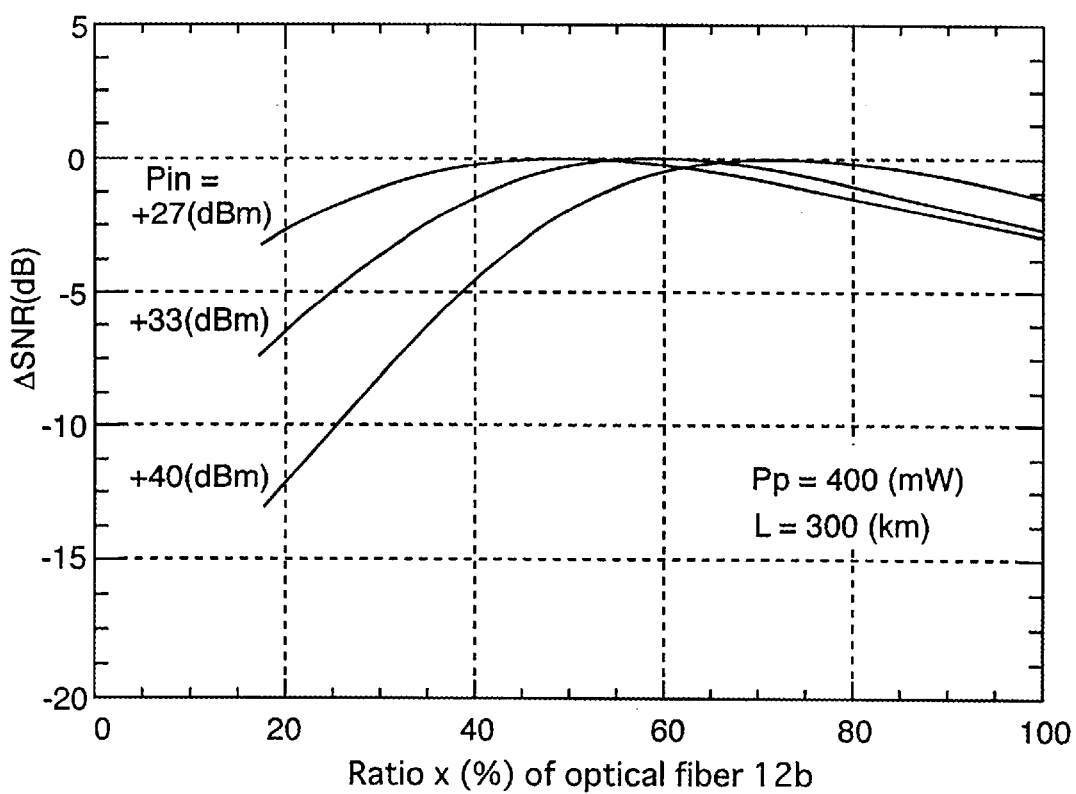
FIG. 5 is a diagram showing deviations from the maximum S/N ratio relative to the ratio x of the optical fiber 12b when the fiber input power Pin is varied.

FIG. 4 shows variations of the S/N ratio relative to x when the fiber input power Pin is varied on condition that the pumping power is 400 mW and the transmission line length L is 300 km. The vertical axis shows the S/N ratio, and the horizontal axis shows x. FIG. 5 shows deviations from the maximum S/N ratio relative to x. The vertical axis shows the deviations from the maximum S/N ratio, and the horizontal axis shows x. It is clear from FIGS. 4 and 5 that the ratio x of the optical fiber 12b to obtain the maximum S/N ratio, namely the optimum ratio, increases according to the fiber input power Pin.

Figure 6:
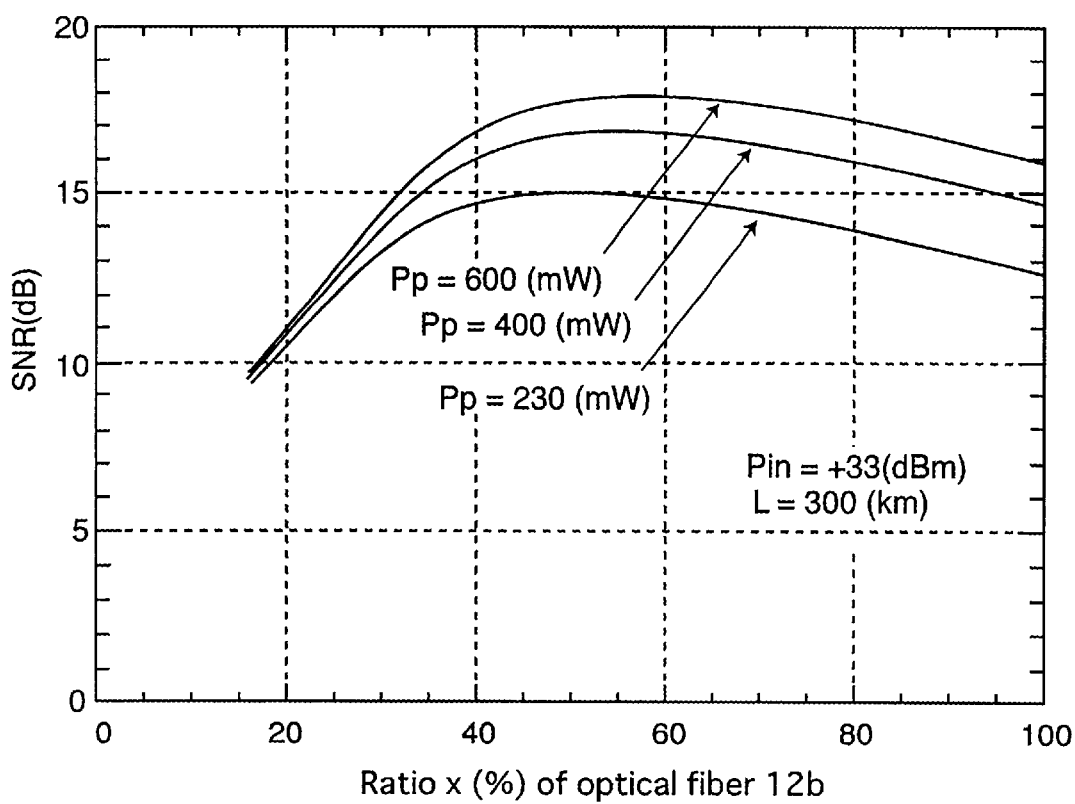
FIG. 6 is a diagram showing variations of the S/N ratio relative to the ratio x of the optical fiber 12b when Raman pumping power Pp is varied.
Figure 7:
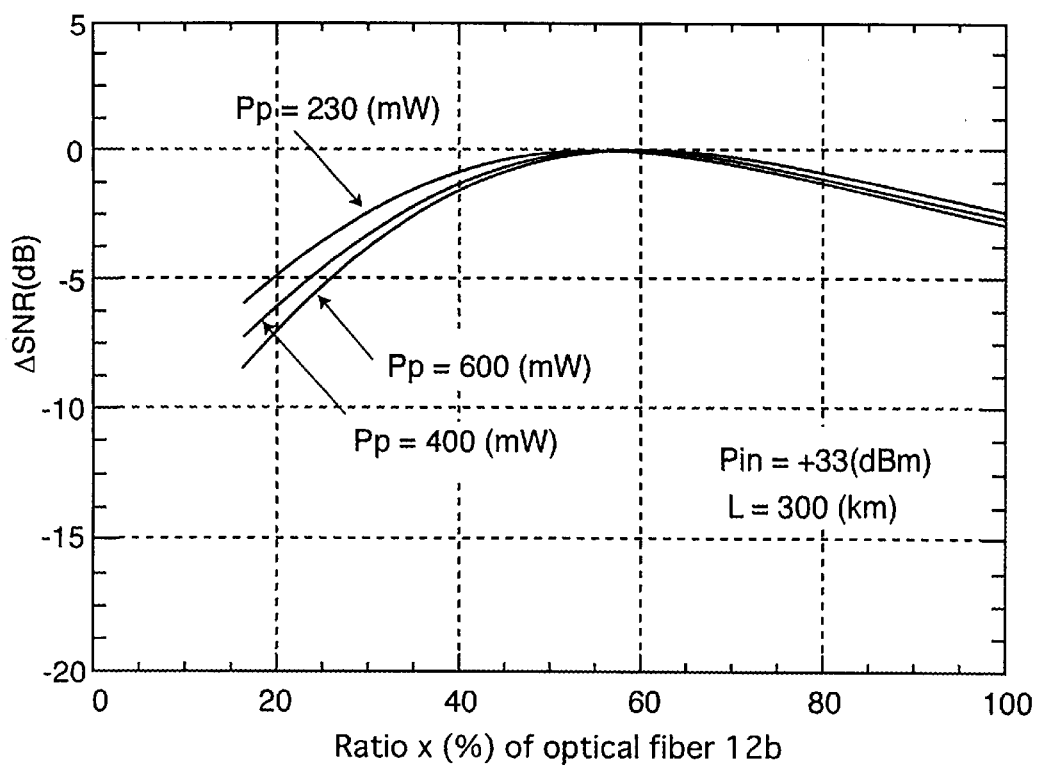
FIG. 7 is a diagram showing deviations from the maximum S/N ratio relative to the ratio x of the optical fiber 12b when the Raman pumping power Pp is varied.

FIG. 6 shows variations of the S/N ratio relative to x when the Raman pumping power Pp is varied on the condition that the fiber input power Pin is 33 dBm and the transmission line length L is 3000 km. The vertical axis shows the S/N ratio, and the horizontal axis shows x. FIG. 7 shows deviations from the maximum S/N ratio relative to x. It is clear from FIGS. 6 and 7 that the optimum ratio x of the optical fiber 12b slightly increases according to the Raman pumping power Pp.

Similar measurement tests are performed on the conditions that the transmission line length L is 100 km and 200 km. The tendencies shown in FIGS. 4 through 7 are basically the same even the transmission line length L is varied.

Figure 8:
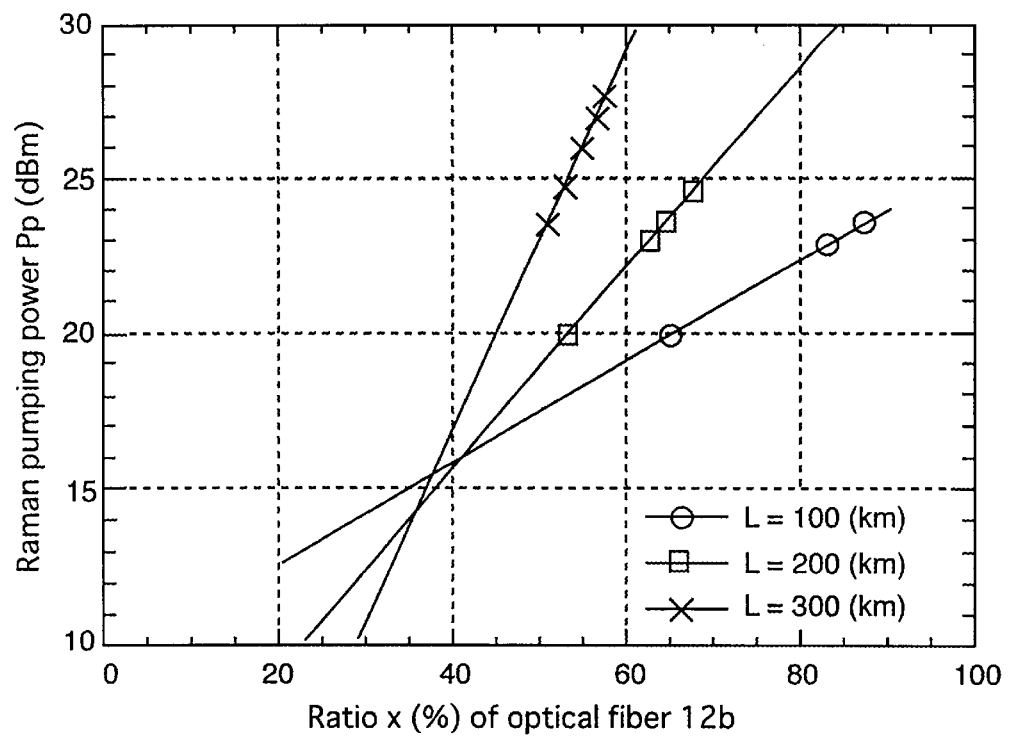
FIG. 8 is a diagram showing variations of the Raman pumping power Pp relative to the ratio x of the optical fiber 12b which produces the maximum S/N ratio.

Provided that the fiber input power Pin is fixed, it is examined how the ratio of the optical fiber 12b to obtain the maximum S/N ratio varies relative to the Raman pumping power Pp. The result is shown in FIG. 8. The vertical axis shows the Raman pumping power Pp, and the horizontal axis shows the ratio x of the optical fiber 12b. It is clear that the optimum ratio x of the optical fiber 12b is proportional to the Raman pumping power Pp, and its slope depends on the transmission line length L.

Figure 9:
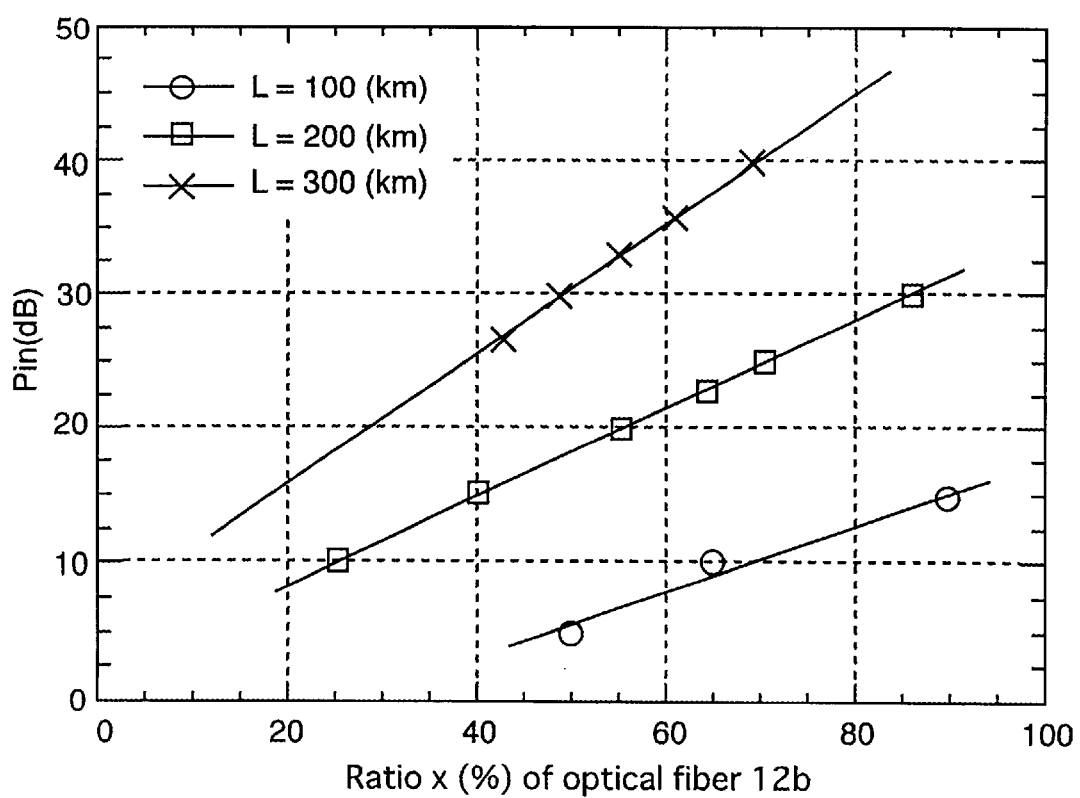
FIG. 9 is a diagram showing variations of the fiber input power Pin relative to the ratio x of the optical fiber 12b which produces the maximum S/N ratio.

On the other hand, provided that the Raman pumping power Pp is fixed, it is examined how the optimum ratio of the optical fiber 12b varies relative to the fiber input power Pin. The result is shown in FIG. 9. The vertical axis shows the fiber input power Pin (i.e. the output power of the optical transmitter 10), and the horizontal axis shows the ratio x of the optical fiber 12b. Clearly, the optimum ratio x of the optical fiber 12b is proportional to the fiber input power Pin, and its slope depends on the transmission line length L.

FIG. 10 is obtained from the results shown in FIGS. 8 and 9. When the fiber input power, the total loss of the optical fibers 12a and 12b, the pumping power for the Raman amplification and the transmission line length are expressed as Pin, $\alpha$, Pp and L respectively, the vertical axis shows (Pin−$\alpha$)/(Pp·10 Log L), and the horizontal axis shows the optimum ratio x of the optical fiber 12b. Provided that y=(Pin−$\alpha$)/(Pp·10 Log L), a measured value ○ shows a combination of x and y to give the maximum S/N ratio and measured values □ and x show a combination of x and y to give S/N ratio 1 dB lower than the maximum S/N ratio.

A straight line 40, obtained from the measured values ○, is expressed as the following equation.

$$y = 6.63 \times 10^{-2} x - 0.077$$

Here, when x and y are located between a straight line 42 which is 0.2 larger than the straight line 40 and a straight line 44 which is 0.2 smaller than the straight line 40, preferable transmission characteristics in terms of the S/N ratio are obtained. The straight line 42 is expressed as the following equation.

$$y = 6.63 \times 10^{-2} x - 0.077 + 0.2$$
$$= 6.63 \times 10^{-2} x + 0.123$$

The straight line 44 is expressed as the following equation.

$$y = 6.63 \times 10^{-2} x - 0.077 - 0.2$$
$$= 6.63 \times 10^{-2} x - 0.277$$

Although such case that the invention is applied to the repeaterless optical transmission system is explained as an example, this invention is naturally applicable to an optical transmission line of a single repeater span in an optical transmission system.

As readily understandable from the aforementioned explanation, according to the invention, it is possible to largely extend a repeaterless transmission distance in satisfactory transmission characteristics by utilizing Raman amplification to optimize an effective core area of an optical fiber.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical transmission line comprising:

a first optical fiber to transmit a signal light, the first optical fiber having a first effective core area and a first chromatic dispersion value;

a second optical fiber to transmit the signal light from the first optical fiber, the second optical fiber having a second effective core area smaller than the first effective core area and a second chromatic dispersion value which is smaller than or a negative-polarity of the first chromatic dispersion value;

a pumping light source to generate pumping light to cause Raman amplification in the second optical fiber; and an optical coupler to apply the pumping light from the pumping light source into the second optical fiber from the back, wherein on condition that y=(Pin−$\alpha$)/(Pp·10 Log L) where input power of the first optical fiber is expressed as Pin (dBm), a total loss of the first and second optical fibers is expressed as $\alpha$ (dB), Raman pumping power is expressed as Pp (dBm), and a total length of the first and second optical fibers is expressed as L (kin), y is no more than $6.63 \times 10^{-2} x + 0.123$ and no less than $6.63 \times 10^{-2} x - 0.277$ where x is ratio of the second optical fiber relative to L.

2. The optical transmission line of claim 1 wherein y is approximately equal to $6.63 \times 10^{-2} x - 0.077$.

3. The optical transmission line of claim 1 wherein an effective core area of the second optical fiber is in the range of 55 $\mu m^2$ to 70 $\mu m^2$.

* * * * *